E. ROY.
VEHICLE SPRING.
APPLICATION FILED JULY 10, 1916.
1,207,633.
Patented Dec. 5, 1916.
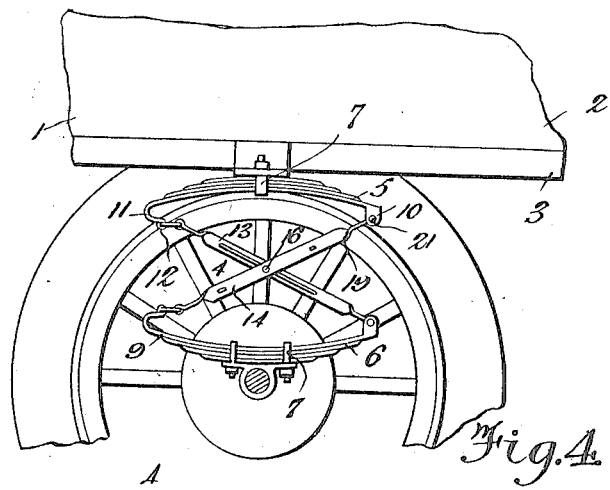
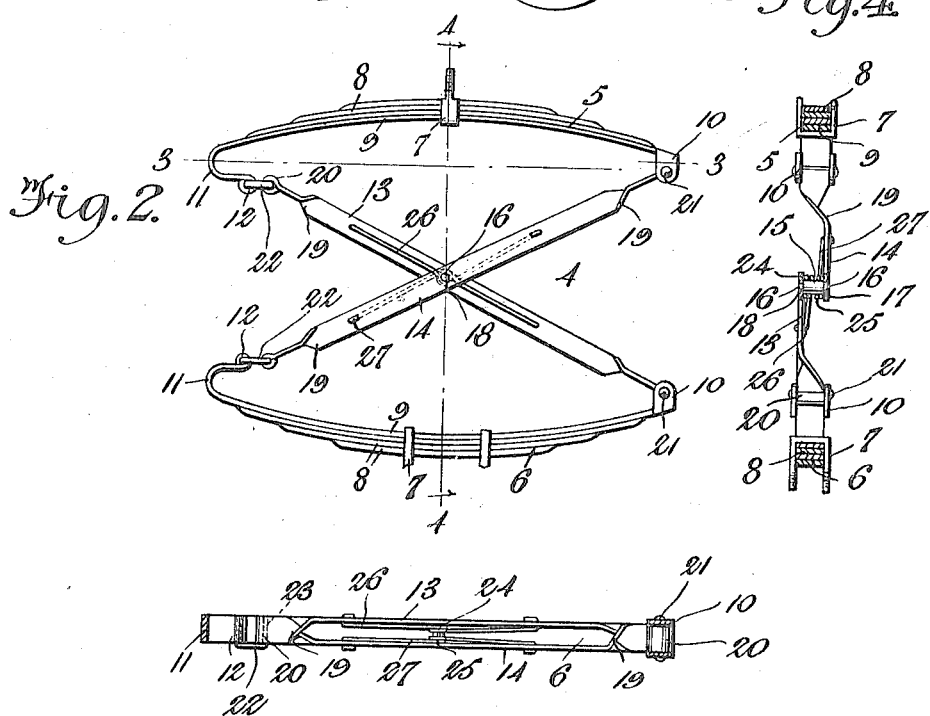
Witness
Frederick W. Ely
Inventor
Elzear Roy.
By Victor J. Evans
Attorney

UNITED STATES PATENT OFFICE.

ELZEAR ROY, OF MALDEN, MASSACHUSETTS.

VEHICLE-SPRING.

1,207,633.

Specification of Letters Patent.   Patented Dec. 5, 1916.

Application filed July 10, 1916.   Serial No. 108,438.

*To all whom it may concern:*

Be it known that I, ELZEAR ROY, a citizen of the United States, residing at Malden, in the county of Middlesex and State of Massachusetts, have invented new and useful Improvements in Vehicle-Springs, of which the following is a specification.

This invention relates to a spring and more particularly to a spring which is especially adapted for use upon vehicles, such as automobiles, and the like.

The primary object of the invention is to provide a spring wherein a pair of spaced spring sections have terminally connected therewith pivoted and crossed links arranged between the spring sections and having connected therewith arms on springs coiled about the pivotal connection of the links and normally exerting an influence to hold the ends of the links in spaced relation thereby greatly increasing the cushioning effect of the spring when applied to a vehicle of the class described.

Another object of the invention is to provide a spring wherein the pivotally connected and spring controlled links which are arranged between the spring sections are connected therewith in such a manner that undue strain will not be imposed upon the connection between the links and spring sections when the spring is in use thereby greatly increasing the cushioning effect of the spring.

With these and other objects in view, the invention resides in the novel combination and arrangement of parts, which will be hereinafter described and particularly pointed out in the claims.

The preferred embodiment of the invention has been illustrated in the accompanying drawing, although no restriction is necessarily made to the precise details of construction therein shown, as changes, alterations, and modifications, within the scope of the claims may be resorted to when desired.

Like characters of reference denote corresponding parts throughout the several views in the drawing, in which:—

Figure 1 is a side elevation of a portion of an automobile showing the improved spring applied thereto. Fig. 2 is a view in elevation upon an enlarged scale showing the improved spring disconnected from the vehicle. Fig. 3 is a horizontal transverse sectional view on the line 3—3 of Fig. 2. Fig. 4 is a vertical transverse sectional view on the line 4—4 of Fig. 2.

Referring now to the drawing in detail, the numeral 1 designates a portion of an automobile including a body 2 supported above the frame 3 of the running gear by means of the improved spring 4 having spaced spring sections 5 and 6 connected with the body and frame respectively by means of clips 7. Each of the spring sections 5 and 6 is formed from spring leaves 8 arranged one upon the other and gradually decreasing in length in the usual manner with the longer leaf 9 thereof provided at one end with a pair of spaced ears 10 and having its other end bent to form a curved arm 11 terminating at its free end in an eye 12. Links 13 and 14 are crossed between their ends to extend diagonally between the arms 11 and ears 10 on the spring sections 5 and 6, said links having arranged therebetween a spacing member 15 provided at each end with an extension 16 forming shoulders 17 upon the spacing member with which the links 13 and 14 are held in contact by the extensions 16 which pass through openings 18 in the links to enable said extensions to serve as trunnions about which the links are adapted to turn.

Each link 13 and 14 is twisted as at 19, near each end so that the ends of the links which terminate in eyes 20 lie in a plane parallel to the longer leaves 9 of the spring sections 5 and 6. Each of the links 13 and 14 has the eye 20 at one end thereof arranged between the ears 10 on one of the spring sections 5 and 6 and pivotally connected therewith through the medium of a pivot pin 21 passing through the eyes in the links and through the ears 10. The other end of each link is connected with an arm on a spring section by a U-shaped yoke 22 having the arms 23 thereof mounted to turn in the eye 20 on the link and the eye 12 on the arm 11 with which the link is connected by the yoke. Springs 24 and 25 are coiled about the spacing member 15 with each spring having an arm 26 connected at its free end with a link 13 and its other arm 27 connected with a link 14 so that the springs 24 and 25 normally exert an influence upon the links to hold the spring sections in spaced relation.

When the improved spring 4 has been connected with a vehicle as shown in Fig. 1 in the drawing, it will be seen that through the connection of the links 13 and 14 with the spring sections, the cushioning action of the spring is greatly increased and that by connecting the links 13 and 14 with the arms 11 on the spring sections undue strain is prevented from being imposed upon the connection between the links and the spring sections when the spring is in use.

From the foregoing statements, taken in connection with the accompanying drawing, it is at once apparent that a vehicle spring has been provided which is simple in construction, therefore, inexpensive of manufacture, yet highly efficient in use.

Having thus described the invention, what is claimed as new, is:

1. A spring comprising a pair of spring sections arranged in spaced relation, pivotally connected and crossed links interposed between the spring sections and terminally connected therewith, and springs arranged between the links and having arms connected therewith.

2. A spring comprising a pair of spring sections arranged in spaced relation, an arm at one end of each spring section, yokes carried by said arms, a spacing member, crossed links mounted to turn on the spacing member and terminally connected with the spring sections and yokes, and springs carried by the spacing member and having spaced arms terminally connected with the respective links.

3. A spring comprising a pair of spring sections arranged in spaced relation, a curved arm at one end of each spring section, yokes mounted to turn in said arms, a spacing member, trunnions on the ends of the spacing member, crossed links mounted to turn on said trunnions and pivotally connected with the spring sections and yokes, and springs coiled about said spacing member and having spaced arms terminally connected with the respective links.

In testimony whereof I affix my signature.

ELZEAR ROY.

Copies of this patent may be obtained for five cents each, by addressing the "Commissioner of Patents, Washington, D. C."